US007011183B2

(12) United States Patent
Picouet

(10) Patent No.: US 7,011,183 B2
(45) Date of Patent: Mar. 14, 2006

(54) SUCTION OIL INJECTION FOR ROTARY COMPRESSOR

(75) Inventor: Jean-Louis Picouet, Waukesha, WI (US)

(73) Assignee: Vilter Manufacturing LLC, Cudahy, WI (US)

( * ) Notice: Subject to any disclaimer, the term of this patent is extended or adjusted under 35 U.S.C. 154(b) by 18 days.

(21) Appl. No.: 10/097,877

(22) Filed: Mar. 14, 2002

(65) Prior Publication Data

US 2003/0173155 A1 Sep. 18, 2003

(51) Int. Cl.
*F01M 1/00* (2006.01)
*F04C 15/02* (2006.01)

(52) U.S. Cl. ....................................... 184/6.16; 418/97

(58) Field of Classification Search ............... 184/6.11, 184/6.16, 58; 418/97, 100

See application file for complete search history.

(56) References Cited

U.S. PATENT DOCUMENTS

| | | | | |
|---|---|---|---|---|
| 2,285,426 A | | 6/1942 | Freeman | 230/206 |
| 2,313,387 A | | 3/1943 | McArthur et al. | 230/207 |
| 2,701,684 A | | 2/1955 | Hirsch | 230/207 |
| 3,429,502 A | | 2/1969 | Lundvik | 230/206 |
| 3,618,708 A | | 11/1971 | Deines | 184/6.4 |
| 3,698,838 A | | 10/1972 | Holdsworth et al. | 417/228 |
| 4,123,203 A | | 10/1978 | Kathmann et al. | 417/252 |
| 4,171,188 A | | 10/1979 | Anderson et al. | 417/282 |
| 4,262,775 A | | 4/1981 | Webb | 184/6.4 |
| 4,285,640 A | | 8/1981 | Mukai | 417/269 |
| 4,323,452 A | | 4/1982 | Witzenburg | 210/188 |
| 4,413,954 A | | 11/1983 | Okazaki | 417/269 |
| 4,583,919 A | | 4/1986 | Keith | 417/228 |
| 4,605,357 A | | 8/1986 | Keith | 417/228 |
| 5,044,892 A | | 9/1991 | Pettitt | 417/269 |
| 5,176,505 A | | 1/1993 | Horii et al. | 417/295 |
| 5,526,795 A | | 6/1996 | Thompson et al. | 123/516 |
| 5,542,499 A | | 8/1996 | Westermeyer | 184/103.2 |
| 5,688,109 A | * | 11/1997 | Matsuura et al. | 417/228 |
| 5,735,676 A | | 4/1998 | Loos | 417/407 |
| 5,765,392 A | * | 6/1998 | Baur | 62/473 |

(Continued)

*Primary Examiner*—Chong H. Kim
(74) *Attorney, Agent, or Firm*—Whyte Hirschboeck Dudek SC

(57) ABSTRACT

An apparatus and system for immediately lubricating a compressor within a compressor system using a suction oil line apparatus. The compressor system comprises a compressor, a power source for operating the compressor, a tank capable of storing oil therein, a conventional oil line, and a suction oil line apparatus. The suction oil line apparatus can comprise a suction oil line and a valve. When the power source is actuated, gas is introduced into a suction cavity within the compressor, drawn into a compression chamber within the compressor, and compressed. The compressed gas is discharged into a tank thereby elevating a tank pressure. The elevated tank pressure causes the oil within the tank to be transported through the suction oil line. Transportation of the oil through the suction oil line permits immediate lubrication of the compressor to occur following start-up of the compressor, immediate being from about one second to about one minute. Start-up can comprise initiation of the compressor, movement of components within the compressor, movement of intimate components within the compressor, or actuation of the power source. When the tank pressure reaches a pre-determined pressure, the valve in the suction oil line is closed. The closed valve results in the oil being prohibited from flowing through the suction oil line and permitted to flow through the conventional oil line. As such, the compressor remains continuously lubricated. Further, immediate lubrication can be accomplished without the need for a back-pressure valve or pump.

38 Claims, 1 Drawing Sheet

U.S. PATENT DOCUMENTS

| | | | | |
|---|---|---|---|---|
| 5,823,177 | A | 10/1998 | Whitehead | 126/640 |
| 5,904,737 | A | 5/1999 | Preston et al. | 8/158 |
| 6,216,302 | B1 | 4/2001 | Preston et al. | 8/158 |
| 6,305,189 | B1 | 10/2001 | Menin | 62/544 |
| 6,412,476 | B1 | 7/2002 | Thompson et al. | 123/516 |
| 6,536,059 | B1 | 3/2003 | McClain et al. | 8/158 |

* cited by examiner

SUCTION OIL INJECTION FOR ROTARY COMPRESSOR

BACKGROUND OF THE INVENTION

1. Field of the Invention

The present invention generally relates to an apparatus and system for lubricating a compressor. In one aspect, the system relates to an apparatus for immediately lubricating the intimate, rubbing parts of a rotary-type compressor.

2. Description of the Related Art

A typical compressor comprises a variety of components, for example a rotor and a shaft. When the compressor is operated, these components contact each other such that surfaces of the components rub, grate, scrape, and/or wear against each other. Therefore, it is generally necessary to provide the compressor and/or components with lubrication. Lubrication can comprise oil or other known lubricating fluids. If the components are not adequately lubricated, numerous undesirable conditions can be encountered.

Shifting, sliding, abrading, and/or rotating components (i.e., components in "intimate" contact) are continually opposed by friction. As such, failure to provide lubrication (or a failure to provide adequate lubrication) can permit friction to inhibit, or prevent altogether, relative movement of the components.

Similarly, friction can also produce a strain upon a power source (e.g., a motor) driving the compressor. Because friction opposes the relative movement of components, the power source can be required to output more force in order to actuate the components. Thus, the power source can become substantially burdened in trying to begin and/or maintain movement. Further, without lubrication, friction generated between components can produce a generous amount of heat. If the generated heat becomes excessive, it can damage components, cause the components to wear prematurely, score the lubrication fluid, and the like.

Abrasion of non-lubricated, or sparsely lubricated, components in intimate engagement can cause surfaces of the components to become scored, pitted, gouged, or otherwise damaged. Not only can this ruin a fluid seal between components, but it can also launch debris, contaminants, and/or other particles into the compressor and associated equipment in a compressor system.

A typical compressor also draws a gas into a suction chamber, routes that gas from the suction chamber to a compression chamber, and then compresses the gas within the compression chamber. During this compression process, volume of the gas decreases and pressure of the gas increases. This causes heat to be generated and/or produced within the compressor and/or compression chamber. Production of heat within the compressor and/or compression chamber can result in rising compressor and/or component temperatures. Again, it is generally necessary to provide the compressor and/or components with lubrication. When the compressor is provided with lubrication, heat generated during the compression process can be absorbed, dissipated, and/or removed by the lubrication. As such, the compressor and/or components are inhibited and/or prevented from overheating, expanding, rubbing, wearing, and the like.

Providing lubrication oil to a compressor and/or components is strongly encouraged to prevent or discourage the above-described problems. Since a failure to provide lubrication, or provide sufficient lubrication, is most troublesome during start-up of the compressor, several approaches have been suggested to solve lubrication problems during this time period.

One method of providing lubrication at or near start-up includes using a pump within the compressor system. Such pumps are capable of encouraging oil to flow and can be activated prior to initialization of the compressor. As such, it is possible to provide oil or other lubricant to the compressor prior to the compressor beginning to operate. Although using pumps in the compressor system may provide lubrication to a compressor and/or associated components, it requires a more complex compressor system. For instance, a pump and a power source to operate the pump must be employed within the compressor system.

Another method of providing lubrication to a compressor at or near start-up comprises using a back-pressure valve on the tank, the sump, and/or a conventional oil line ("tank"). When a back-pressure valve is employed, expulsion or discharge of a gas (or a compressed gas) from the tank is restricted and/or temporarily prohibited. By inhibiting and/or preventing the release of gas, pressure within the tank can be rapidly increased. This can quickly create a pressure differential between the tank and the compressor, thereby permitting oil to be quickly transported and/or pushed through the compressor system. Again, although such a system may provide lubrication to a compressor and/or associated components, the system becomes more complex.

Thus, an apparatus and system capable of providing immediate lubrication to a compressor and/or associated components at start-up of the compressor, without the need for a pump or a back-pressure valve, would be highly desirable.

SUMMARY OF THE INVENTION

In one aspect, the invention provides an apparatus for providing immediate lubrication to a compressor within a pump-less compressor system free of any back-pressure valve. The compressor system that employs the apparatus comprises the compressor having a suction cavity and a compression chamber, a tank containing oil, a conventional oil line, and the apparatus. The apparatus used in the compressor system comprises a suction oil line and a selectively actuatable valve within the suction oil line.

Transportation of the oil in the compressor system occurs as gas is drawn into the suction cavity of the compressor, the gas is drawn into the compression chamber of the compressor, the compressor compresses the gas, and the compressor discharges the compressed gas into the tank. The discharged compressed gas elevates the tank pressure, the oil is transported from the tank through the suction oil line due to the elevated tank pressure, and the transported oil is injected into the suction cavity of the compressor.

When a tank pressure is elevated to a pre-determined pressure, the selectively actuatable valve is closed to prohibit transportation of the oil through the suction oil line. Thus, the valve prohibits transportation of the oil through the suction oil line and simultaneously encourages transportation of the oil through the conventional oil line. As such, the compressor can be continually lubricated.

Transportation of the oil within the compressor system can occur at a low pressure differential between the compressor and the tank or between a suction line aperture on the tank and a suction oil port on the compressor.

The suction oil line can include a filter capable of removing debris, contaminants, and other particles from the oil being transported through the suction oil line. The conventional oil line can include an oil cooler capable of cooling the oil transported through the conventional oil line. The tank can comprise a separator tank capable of separating the oil from a gas, a compressed gas, a liquid, and/or a mixture of the gas, the compressed gas, and the liquid. Also, the compressor can contain a shaft and a rotor which are, like the compressor, immediately lubricated. The compressor can be a rotary compressor, a rotary piston compressor, a rotary vane compressor, a scroll compressor, and a screw compressor.

Immediate lubrication generally commences at either initiation of the compressor, movement of components within the compressor, movement of intimate components within the compressor, or actuation of the power source.

In another aspect, the invention provides a pump-less system, free of a back-pressure valve, for immediately lubricating a compressor. The system comprises the compressor having a suction cavity and a compression chamber, a power source, a tank, a conventional oil line, and a suction oil line having a selectively actuatable valve therein. The compressor is capable of receiving gas and discharging compressed gas. The power source is present to power the compressor and the tank is available to collect oil, gas, compressed gas, and liquid. The suction oil line and the conventional oil line each permit the tank and the compressor to be in fluid communication. The tank defines a tank pressure.

When the power source is activated, the gas is received by the compressor, the compressor compresses the gas, and the compressed gas is discharged from the compressor into the tank. Thereafter, the discharged compressed gas elevates the tank pressure, the elevated tank pressure results in the oil being transported from the tank through the suction oil line, and the suction oil line injects the transported oil into the suction cavity of the compressor such that the compressor is immediately lubricated with the transported oil.

The valve in the suction oil line can be closed when the tank pressure within the tank reaches a pre-determined pressure within the tank. In one embodiment, the pre-determined pressure is that pressure sufficient to transport the oil through the conventional oil line. After the valve is closed, the pre-determined pressure within the tank transports the oil from the tank through the conventional oil line, and the conventional oil line injects the transported oil into the compression chamber of the compressor such that the compressor is lubricated with the transported oil. Thus, the compressor is continuously lubricated upon the selectively actuatable valve being closed and the transported oil being transported through the conventional oil line in lieu of the suction oil line.

In yet another aspect, the invention provides a method for immediately lubricating a compressor, after the compressor is started, without using a pump or a back-pressure valve. Generally, the method comprises providing the compressor having a suction cavity and a compression chamber, a power source, a tank having oil therein, and a suction oil line that can provide fluid communication between the tank and the compressor. The tank defines a tank pressure.

Upon providing the above, the power source is actuated to power the compressor, a gas is drawn into the compressor and then into the compression chamber, and the gas is compressed. The compressed gas is then discharged from the compressor into the tank to elevate the tank pressure. By virtue of the elevated tank pressure, the oil is transported through the suction oil line and injected into the suction cavity of the compressor. As such, the compressor is immediately lubricated.

When the tank pressure is elevated to the pre-determined tank pressure, the oil is prohibited from being transported through the suction oil line. This is accomplished by closing a valve disposed within the suction oil line. Thereafter, by virtue of the elevated tank pressure, the oil can now be transported through the conventional oil line that also provides fluid communication between the tank and the compressor. Thus, upon being transported through the conventional oil line, the oil has been simultaneously prohibited from being transported through the suction oil line. While the flow of oil is diverted from the suction oil line to the conventional oil line, the compressor is continuously lubricated.

BRIEF DESCRIPTION OF THE DRAWINGS

Embodiments of the invention are disclosed with reference to the accompanying drawings and are for illustrative purposes only. The invention is not limited in its application to the details of construction, or the arrangement of the components, illustrated in the drawings. The invention is capable of other embodiments or of being practiced or carried out in other various ways. Like reference numerals are used to indicate like components.

DETAILED DESCRIPTION OF THE PREFERRED EMBODIMENTS

Figure 1:
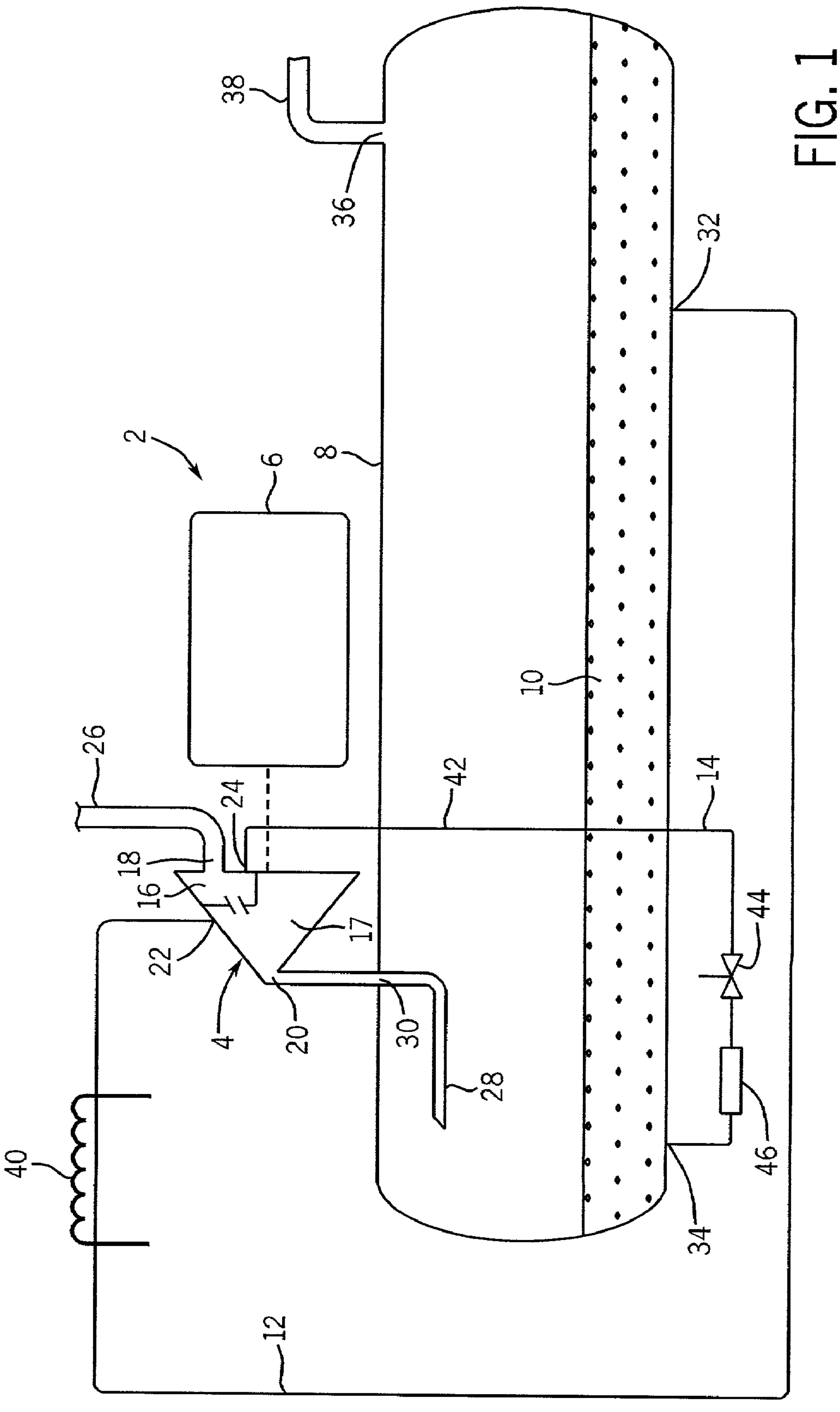
FIG. 1 illustrates a schematic view of a suction oil system for lubricating a compressor.

Referring to FIG. 1, a suction oil system for lubricating a compressor (a "compressor system") is illustrated. Compressor system 2 comprises compressor 4, a power source 6 for operating the compressor, a tank 8 capable of storing oil 10 therein, a conventional oil line 12, and a suction oil line apparatus 14.

Compressor 4 comprises suction cavity 16 and compression chamber 17, each of the suction cavity and the compression cavity being defined by and disposed within the compressor. Compressor 4 further comprises gas inlet aperture 18, compressor outlet aperture 20, conventional oil port 22, suction oil port 24, and internal components such as a rotor and a shaft (not shown). Suction cavity 16 is that area within compressor 4 that is proximate gas inlet aperture 18 while compression chamber 17 basically comprises the remainder of the area within the compressor. Suction cavity 16 and compression chamber 17 are in fluid communication such that, for example, gas and oil can flow between the suction cavity and the compression chamber. Internal components can be disposed within suction cavity 16, compression chamber 17, and/or elsewhere within compressor 4. Compressor 4, as described herein, can comprise a variety of compressors. For example, compressor 4 can be a rotary piston compressor, a rotary vane compressor, a scroll compressor, a screw compressor, and the like.

As illustrated in FIG. 1, gas inlet pipe 26 can be secured to compressor 4 at gas inlet aperture 18. Gas inlet pipe 26 is capable of introducing gas into compressor 4 where, once inside the compressor, the gas is directed to suction cavity 16. As compressor 4 is operated, the gas temporarily residing within suction cavity 16 is drawn into compression chamber 17 where the gas is compressed.

Compressor outlet pipe 28 can be secured to compressor 4 at compressor outlet aperture 20. Compressor outlet pipe 28 is capable of transporting gas, compressed gas, liquid, oil and/or a combination of these substances (collectively referred to as a "mixture"). As shown in FIG. 1, the substances, or the mixture of the substances, can be discharged from compressor 4 at compressor outlet aperture 20 though compressor outlet pipe 28.

Tank 8 comprises tank inlet aperture 30, conventional line aperture 32, suction line aperture 34, tank outlet aperture 36. Tank inlet aperture 30 receives compressor outlet pipe 28 therein, thus permitting any of the substance and/or the mixture that exits outlet pipe 28 to be released within tank 8. Therefore, as compressor 4 compresses gas within compression chamber 17, and the compressed gas is discharged from the compressor, outlet pipe 28 can deposit the compressed gas within tank 8.

Tank outlet aperture 36 can be securable to, and associated with, tank discharge pipe 38. In a preferred embodiment, gas and/or compressed gas are free to escape from tank outlet aperture 36 and/or tank discharge pipe 38 without resistance. In other words, expulsion of gas and/or compressed gas from tank 8 is unrestricted. As known in the art, conventional tanks frequently employ a back-pressure valve, or like functioning device, at tank outlet aperture 36 and/or within tank discharge pipe 38. Back-pressure valves can be used in combination with a conventional tank to accelerate pressure build-up within the conventional tank. Notably, such a back-pressure valve is not associated with tank 8 and/or employed by compressor system 2.

In a preferred embodiment, as illustrated in FIG. 1, tank 8 can comprise a separator tank capable of disassociating gas and/or compressed gas from oil 10. In another embodiment, tank 8 can comprise an oil sump, all or a portion of a conventional oil line, other gas/oil storage containers, and the like. Tank 8 can be mounted or positioned horizontally, vertically, or otherwise, within compressor system 2.

In addition to tank 8 accepting gas and compressed gas, tank 8 can also contain, store, and/or house oil 10 (as well as the mixture). In preferred embodiments, oil 10 can comprise lubricating oil, oil known in the art for use with compressors, and oil capable of lubricating components in intimate contact. Within compressor system 2, oil 10 can be employed for lubrication of compressor 4 and/or associated components. Oil 10 can also provide other benefits as well, such as cooling compressor 4 and its components, which further benefits are well known in the art.

Conventional oil line 12 can comprise a pipe, conduit, or other member capable of introducing oil into a compressor. In one embodiment, conventional oil line 12 can include an oil cooler 40, an oil filter (not shown), and/or like devices. As the name suggests, oil cooler 40 is capable of cooling oil 10 as the oil travels within compressor system 2. Although not shown, the oil filter is capable of removing debris, contaminants, and/or other particles from oil 10 as the oil is transported throughout compressor system 2. Opposing ends of conventional oil line 12 are securable to compressor 4 at conventional oil line aperture 32 and conventional oil port 22, respectfully, as illustrated in FIG. 1. While conventional oil line 22 is illustrated as connected to compressor 4 proximate compression chamber 17, it is contemplated that the conventional oil line can also be connected to compressor 4 proximate suction cavity 16. Thus, conventional oil line 12 permits fluid communication between tank 8 and compressor 4.

In the arrangement shown in FIG. 1, oil 10 from tank 8 can flow through conventional oil line 12 from conventional line aperture 32 to conventional oil port 22. Upon reaching conventional oil port 22, oil 10 can be injected into compression chamber 17, suction cavity 16, and/or compressor 4 depending on where conventional oil port 22 is disposed upon the compressor. Upon being injected within (or while residing within) compressor 4, compression chamber 17, and/or suction cavity 16, the oil can lubricate and/or cool compressor 4 and any associated and/or intimate components (e.g., rotor, shaft, and the like). Oil 10 (and/or the mixture) can then be discharged from compressor 4 and/or compression chamber 17 at compressor outlet aperture 20. From there, oil 10 (and/or the mixture) can be delivered to tank 8, typically by compressor outlet pipe 28. Once in tank 8, oil 10 can once again be summoned to complete a lubrication cycle through conventional oil line 12 from the tank, to the compressor, and back to the tank again as described.

Suction oil line apparatus 14 comprises suction oil line 42 and valve 44 disposed within the suction oil line. In one embodiment, suction oil line 42 can include an oil filter 46 (i.e. a screen), an oil cooler (not shown), and/or like devices. Opposing ends of suction oil line 42 are securable to compressor 4 at suction line aperture 34 and suction oil port 24, respectfully, as illustrated in FIG. 1. Thus, suction oil line 42 permits fluid communication between tank 8 and compressor 4.

In the arrangement shown in FIG. 1, oil 10 from tank 8 can flow through suction oil line 42 from suction line aperture 34 to suction oil port 24. Upon reaching suction oil port 24, oil 10 can be injected into suction cavity 16 of compressor 4. Upon being injected within (or while residing within) compressor 4 and/or suction cavity 16, the oil can lubricate and/or cool compressor 4 and any associated components. Thereafter, oil 10 can flow from suction cavity 16 to compression chamber 17 where the oil can continue to lubricate and/or cool compressor 4 and any associated components (e.g., rotor, shaft, and the like). Oil 10 (and/or the mixture) can then be discharged from compression chamber 17 at compressor outlet aperture 20. From there, oil 10 (and/or the mixture) can be delivered to tank 8, typically by compressor outlet pipe 28. Once in tank 8, oil 10 can once again be summoned to complete a lubrication cycle through suction oil line 42 from the tank, to the compressor, and back to the tank again as described.

Valve 44 is selectively actuatable such that oil 10 can be permitted to flow, prohibited from flowing, or restricted from flowing (i.e., partially permitted to flow), within suction oil line 42. Valve 44 can comprise a solenoid valve, a manual valve, and the like. In addition to a valve, any means of discouraging and/or preventing fluid flow known in the art can be utilized within suction oil line apparatus 14. Valve 44 can be automatically actuated (e.g., by sensors, monitors, and the like) or can be manually actuated (e.g., by a compressor system operator).

Power source 6 can comprise a motor, an electric motor, a gas engine, a generator, a gas turbine, and the like. When actuated and/or energized, power source 6 powers, drives, initializes, operates, and/or starts-up compressor 4. Power source 6 can operate by consuming electricity, combustible fuel, and the like.

Utilizing suction oil apparatus 14, compressor system 2 as illustrated in FIG. 1 is capable of providing immediate lubrication (i.e., delivering oil 10) to compressor 4 (and/or associated components) after start-up of the compressor. As used herein, "immediate" is defined as any time from start-up of compressor 4 up to, and including, approximately a minute after start-up of compressor 4. In preferred embodiments, "immediate" is defined as any time from start-up of compressor 4 up to, and including, approximately a first few seconds (e.g., about 1 to about 10 seconds) that elapse after start-up of compressor 4. In more preferred embodiments, "immediate" is defined as any time from start-up of compressor 4 up to, and including, approximately a first few seconds (e.g., about 1 to about 5 seconds) that elapse after start-up of compressor 4. In exemplary embodiments, "immediate" is defined as any time from start-up of compressor 4 up to, and including, approximately a first few seconds (e.g., about 1 to about 3 seconds) that elapse after startup of compressor 4. Therefore, lubrication can occur any time from about zero (0) seconds to about one (1) minute, from about zero (0) to about ten (10) seconds, from about zero (0) to about five (5) seconds, and from about zero (0) to about three (3) seconds from start-up of the compressor and still be considered "immediate" as contemplated by the present invention.

In alternate embodiments, "start-up" of the compressor is defined as initiation of the compressor, movement of components within the compressor, movement of intimate components within the compressor, and actuation of the power source. By providing immediate lubrication, undesirable conditions that plague non-lubricated, or insufficiently lubricated, compressors can be prevented and/or inhibited.

In operation, compressor system 2 begins with valve 44 (within suction oil line 42) in an "open" position, whereby oil is permitted to flow through the suction oil line if encouraged to do so. With suction oil line 42 in such condition, power source 6 is actuated. As a result of power source 6 being triggered, compressor 4 is powered causing the compressor and associated components to shift, move, rotate, and the like. Thus, friction and heat are generated between intimate components and otherwise within compressor 4. This warrants immediate lubrication.

Even at start-up and during the first few seconds of operation, gas (not shown) is drawn through gas inlet pipe 26 and into suction cavity 16 by powered compressor 4. The gas within suction cavity 16 is further drawn into compression chamber 17 where compressor 4 compresses the gas. The compressed gas is then discharged from compression chamber 17 within compressor 4 through compressor outlet pipe 28 and into tank 8.

With the discharge of compressed gas into tank 8, pressure within the tank (i.e., tank pressure) elevates. The greater the amount and/or rate of compressed gas discharged into tank 8, the faster the tank pressure within tank 8 elevates. The elevated tank pressure acts upon oil 10 stored within tank 8, thus encouraging the oil to depart tank 8. As shown in FIG. 1, departure of oil can be accomplished through either suction oil line 42 or conventional oil line 12.

Unfortunately, for oil 10 to be transported through convention oil line 12, a considerable amount of compressed gas must be generated and discharged into tank 8. This can take an inordinate amount of time and, considering the desire for lubrication at start-up, can simply be too long a time period to endure. Further, the discharge of compressed gas into tank 8 must typically be maintained, sustained, and/or kept up to sufficiently preserve the elevated tank pressure which allows oil 10 to be pushed through conventional oil line 12. Thus, if a compressor is only operating for short periods of time (e.g., frequently starting and stopping after operating briefly), a sufficiently elevated tank pressure may not be able to be sustained.

However, since suction oil line 42 is preferably shorter in length than conventional oil line 12, and has less of a pressure differential, the suction oil line is more reactive and/or sensitive to pressure increases in tank 8. Therefore, the tank pressure need not elevate to a level sufficient to transport oil 10 through conventional oil line 12 in order to transport the oil through suction oil line 42. In other words, oil flows more easily through suction oil line 42.

Without having to wait for tank pressure within tank 8 to significantly increase, oil 10 can immediately, upon compressor start-up, begin flowing through suction oil line 42. As such, oil 10 is transported from tank 8 through suction oil line 14 and into suction cavity 16 of compressor 4 to immediately lubricate the compressor. During this same period of time, compressed gas generated and discharged by compressor 4 into tank 8 is free to exit the tank through tank outlet pipe 38. No back pressure valve is disposed at tank outlet aperture 36 or within tank outlet pipe 38. Even though the compressed gas is permitted to escape tank 8, suction oil line 42 is responsive and/or reactive enough to the small increase in tank pressure when compressed gas is initially released that oil 10 immediately flows through the suction oil line. Therefore, while the slightly elevated pressure in tank 8 at start-up of the compressor does not have enough force to encourage oil 10 through conventional oil line 12, the slightly elevated pressure does have enough force to encourage the oil through suction oil line 42.

As compressor 4 continues to operate, the tank pressure can continue to rise. This typically occurs as a rate of compressed gas entering tank 8 (e.g., at compressor outlet pipe 28) dominates a rate of compressed gas exiting tank 8 (e.g., at tank discharge pipe 38). Upon the pressure within tank 8 reaching a "pre-determined level" (e.g., a level sufficient to permit oil 10 to be transported through conventional oil line 12), valve 44 within suction oil line 42 can be actuated. When valve 44 is actuated, the flow of oil within suction oil line 42 progressively diminishes (i.e., flow is increasingly restricted) until the valve is finally "closed". When valve 44 is closed, oil 10 is prohibited from being transported through suction oil line 42. By virtue of the elevated tank pressure (i.e., the pre-determined level of pressure), oil 10 can now be transported through conventional oil line 12. Thus, conventional oil line 12, in lieu of suction oil line 42, provides delivery of oil 10 between compressor 4 and tank 8 after valve 44 is closed.

In a preferred embodiment, oil 10 is increasingly restricted from being transported through suction oil line 42 and increasingly permitted to be transported through conventional oil line 12 simultaneously to ensure that compressor 4 is continuously lubricated as valve 44 is being closed. Thus, as oil 10 ceases to flow through suction oil line 42, and commences flowing through conventional oil line 12, delivery of the oil to compressor 4, and therefore the lubrication of the compressor, is uninterrupted.

Additionally, since suction oil apparatus 14 and/or suction oil line 42 inject oil 10 into suction cavity 16, and not compression chamber 17, the oil is not burdened with having to overcome an elevated pressure within the compressor where the oil is injected. Because the gas within compression chamber 17 is compressed, the pressure with compression chamber 17 is increased and the gas exerts that increased pressure upon any oil 10 attempting to enter the compression chamber, for example, at conventional oil port 22 from conventional oil line 12. As a result of the increased pressure within compression chamber 17, the pressure differential between conventional line aperture 32 and conventional oil port 22 can be low. This makes transportation of oil 10 through conventional oil line 12 difficult. Conversely, because the gas within suction cavity 16 can be at a reduced pressure, the pressure within suction cavity 16 is decreased and the decreased pressure of the gas encourages any oil attempting to enter the suction cavity, for example, at suction oil port 24 from suction oil line 42. As a result of the decreased pressure within suction cavity 16, the pressure differential between suction line aperture 34 and suction oil port 24 can be high. Even if pressure within suction cavity 16 is, at the very least, an ambient pressure, the pressure within the suction cavity will not impede the flow of oil into the suction cavity.

In one embodiment, compressor system 2, with suction line 14, is capable of providing lubrication at low differential pressures between tank 8 and suction cavity 16. As used herein, a low pressure differential is defined in one embodiment as a pressure ratio of approximately 1.01, the pressure ratio being discharge pressure (i.e., pressure at suction line aperture 34) divided by suction pressure (i.e., pressure at suction oil port 24). In another embodiment, a low pressure differential is defined as a pressure change of about 0.5 pounds per square inch gauge (psig) between discharge pressure (i.e., pressure at suction line aperture 34) and suction pressure (pressure at suction oil port 24).

Despite any methods being outlined in a step-by-step sequence, the completion of acts or steps in a particular chronological order is not mandatory. Further, elimination, modification, rearrangement, combination, reordering, or the like, of acts or steps is contemplated and considered within the scope of the description and claims.

While the present invention has been described in terms of the preferred embodiment, it is recognized that equivalents, alternatives, and modifications, aside from those expressly stated, are possible and within the scope of the appending claims.

What is claimed is:

1. An apparatus for providing immediate lubrication to a compressor within a compressor system, which is free of a back-pressure valve and in which oil is drawn to the compressor by suction generated by the compressor, the compressor system composing:

- the compressor having a suction cavity and a compression chamber;
- a tank containing oil and having a tank pressure; and
- a first oil line capable of transporting the oil from the tank to the compression chamber within the compressor;

the apparatus comprising:

- a second oil line capable of transporting the oil from the tank to the suction cavity within the compressor, the second oil line separate from the first oil line, with separate apertures from the tank; and
- a selectively actuatable valve within the second oil line for prohibiting transportation of the oil through the second oil line when the tank pressure elevates to a pre-determined pressure.

2. The apparatus of claim 1, wherein the transportation of the oil through the second oil line occurs as gas is drawn into the suction cavity, the compressor compresses the gas within the compression chamber, and the compressor discharges the compressed gas into the tank.

3. The apparatus of claim 1, wherein the transportation of the oil through the second oil line occurs as gas is drawn into the suction cavity, the compressor compresses the gas within the compression chamber, the compressor discharges the compressed gas into the tank, and the discharged compressed gas elevates the tank pressure.

4. The apparatus of claim 1, wherein when the selectively actuatable valve prohibits transportation of the oil through the second oil line, the valve simultaneously encourages transportation of the oil through the first oil line.

5. The apparatus of claim 4, wherein prohibiting transportation of the oil through the second oil line and commencing transportation of the oil through the first oil line occur simultaneously such that the compressor is continuously lubricated.

6. The apparatus of claim 1, wherein the transportation of the oil through the second oil line occurs at a low pressure differential between the tank and the compressor.

7. The apparatus of claim 1, wherein the transportation of the oil through the second oil line occurs at a low pressure differential between a suction line aperture on the tank and a suction oil port on the compressor.

8. The apparatus of claim 1, wherein the second oil line further comprises a filter, the filter capable of removing debris, contaminants, and other particles from the oil being transported through the second oil line.

9. The apparatus of claim 1, wherein a first end of the second oil line is secured to the tank proximate a bottom portion of the tank and a second end of the second oil line is secured to the compressor proximate the suction cavity of the compressor.

10. The apparatus of claim 1, wherein the compressor comprises a shaft and a rotor within the compressor, the transportation of the oil through the second oil line immediately lubricating the shaft and the rotor within the compressor.

11. The apparatus of claim 1, wherein the first oil line comprises an oil cooler disposed within the first oil line, the oil cooler capable of cooling the oil transported through the first oil line.

12. The apparatus of claim 1, wherein the compressor comprises one of a rotary compressor, a rotary piston compressor, a rotary vane compressor, a stroll compressor, and a screw compressor.

13. The apparatus of claim 1, wherein the tank comprises a separator tank capable of separating the oil from at least one of a gas, a compressed gas, a liquid, and a mixture of the gas, the compressed gas, and the liquid.

14. The apparatus of claim 1, wherein lubrication commences at one of initiation of the compressor, movement of components within the compressor, movement of intimate components within the compressor, and actuation of a power source.

15. The apparatus of claim 1, wherein the oil transported to the compressor by the second oil line is injected into the suction cavity.

16. The apparatus of claim 1, wherein the tank pressure transports the oil through the second oil line and to transported oil is injected into the suction cavity.

17. The apparatus of claim 1, wherein the tank pressure transports the oil through the second oil line and the transported oil is injected into the suction cavity such that intimate components within to compressor are immediately lubricated.

18. An apparatus for providing immediate lubrication to a compressor, the compressor system comprising:

- the compressor having a suction cavity and a compression chamber;
- a tank containing oil and having a tank pressure; and
- a first oil line capable of transporting the oil from the tank to the compression chamber within the compressor;

the apparatus comprising:

- a second oil line capable of transporting the oil from the tank to the suction cavity within the compressor, the second oil line separate from the first oil line, with separate apertures from the tank; and
- a selectively actuatable valve within the second oil line for prohibiting transportation of the oil through the second oil line when the tank pressure elevates to a pre-determined pressure;

wherein the compressor system does not contain a back-pressure valve and oil is drawn to the compressor by suction generated by compressor.

19. An apparatus for providing lubrication to a compressor within a compressor system, which is free of a back-pressure valve and in which oil is drawn to the compressor by suction generated by the compressor, the compressor system comprising:

the compressor having a suction cavity and a compression chamber;

a tank containing oil and having a tank pressure; and a first oil line capable of transporting the oil from the tank to the compression chamber within the compressor;

the apparatus comprising:

a second oil line capable of transporting the oil from the tank to the suction cavity within the compressor the second oil line separate from the first oil line, with separate apertures from the tank; and a selectively actuatable valve within the second oil line for prohibiting transportation of the oil through the second oil line when the tank pressure elevates to a pre-determined pressure;

wherein the lubrication of the compressor by the apparatus occurs within a minute from start-up of the compressor.

20. An apparatus for providing lubrication to a compressor within a compressor system, which is free of a back-pressure valve and in which oil is drawn to the compressor by suction generated by the compressor, the compressor system comprising:

the compressor having a suction cavity and a compression chamber;

a tank containing oil and having a tank pressure; and a first oil line capable of transporting the oil from the tank to the compression chamber within the compressor;

the apparatus comprising:

a second oil line capable of transporting the oil from the tank to the suction cavity within the compressor the second oil line separate from the first oil line, with separate apertures from the tank; and a selectively actuatable valve within the second oil line for prohibiting transportation of the oil through the second oil line when the tank pressure elevates to a pre-determined pressure;

wherein the lubrication of the compressor by the apparatus occurs within a few seconds from start-up of the compressor.

21. The apparatus of claim 20, wherein the few seconds is about ten seconds.

22. The apparatus of claim 20, wherein the few seconds is about five seconds.

23. The apparatus of claim 20, wherein the few seconds is about three seconds.

24. The apparatus of claim 20, wherein the few seconds is about one second.

25. A system, which is free of a back-pressure valve and in which oil is drawn to a compressor by suction generated by the compressor, for immediately lubricating the compressor, the system comprising:

the compressor for receiving a gas and discharging a compressed gas, the compressor defining a suction cavity and a compression chamber therein;

a power source for powering the compressor;

a tank capable of collecting oil, gas, liquid, and the compressed gas, the tank having a tank pressure therein;

a first oil line permitting the tank and the compressor to be in fluid communication; and a second oil line having a selectively actuatable valve therein, the second oil line permitting the tank and the compressor to be in fluid communication, the second oil line separate from the first oil line, with separate apertures from the tank;

wherein, when the power source is activated, the gas is received by the suction cavity of the compressor, the gas is drawn into the compression chamber of the compressor, the gas is compressed by the compressor, and the compressed gas is discharged from the compressor into the tank; and wherein the discharged compressed gas elevates the tank pressure, the elevated tank pressure results in the oil being transported from the tank through the second oil line, and the second oil line injects the transported oil into the suction cavity of the compressor such that the compressor is immediately lubricated with the transported oil.

26. The system of claim 25, wherein the valve in the second oil line is closed when the tank pressure within the tank reaches a pie-determined pressure within the tank.

27. The system of claim 26, wherein a pre-determined pressure is sufficient to transport the oil through the first oil line.

28. The system of claim 26, wherein the closed valve simultaneously prohibits the oil from being transported through the second oil line and permits the oil to be transported through the first oil line.

29. The system of claim 28, wherein a pie-determined pressure within the tank transports the oil from the tank through the first oil line, and the first oil line injects the transported oil into the compression chamber of the compressor such that the compressor is lubricated with the transported oil.

30. The system of claim 29, wherein the compressor is continuously lubricated upon the selectively actuatable valve being closed and the transported oil being transported through the first oil line in lieu of the second oil line.

31. The system of claim 25, wherein the system provides immediate lubrication at a low pressure differential between the tank and the compressor.

32. The system of claim 25, wherein the system provides immediate lubrication at a low pressure differential between a suction line aperture on the tank and a suction oil port on the compressor.

33. The system of claim 25, wherein the second oil line further comprises a filter, the filter capable of removing debris, contaminants, and other particles from the oil being transported through the second oil line.

34. The system of claim 25, wherein the compressor comprises a shaft and a rotor within the compressor, the injection of the oil immediately lubricating the shaft and the rotor within the compressor.

35. The system of claim 25, wherein the injection of the oil at least one of absorbs, dissipates, and removes heat generated as the gas within the compression chamber is compressed.

36. The system of claim 25, wherein the compressor can comprise one of a rotary compressor, a rotary piston compressor, a rotary vane compressor, a scroll compressor, and a screw compressor.

37. A method for immediately lubricating a compressor after the compressor is started without using a back-pressure valve and in which oil is drawn to the compressor by suction generated by the compressor, the method comprising:

providing the compressor, the compressor defining a suction cavity and a compression chamber, a power source, a tank having oil therein, the tank defining a tank pressure, and first and second oil lines providing fluid communication from the tank to the compressor, the first and second oil lines separate from one another and each oil line with separate aperture from the tank;

actuating the power source, the power source thereby powering the compressor;

drawing a gas into the suction cavity of the compressor and then into the compression chamber of the compressor;

compressing the gas within the compression chamber of the compressor;

discharging the compressed gas from the compressor into the tank and thereby elevating the tank pressure with the discharged compressed gas;

transporting the oil through the first oil line by virtue of the suction generated by the suction cavity of the compressor and through the second oil line by virtue of the elevated pressure within the tank; and immediately lubricating the compressor by injecting the transported oil from the first line into the suction cavity of the compressor and from the second line into the chamber of the compressor; and prohibiting the oil from being transported through the first oil line by closing a valve disposed within the first oil line when the tank pressure is elevated to a pre-determined tank pressure.

38. A method for immediately lubricating a compressor after the compressor is started without using a back-pressure valve and in which oil is drawn to the compressor by suction generated by the compressor, the method comprising:

providing the compressor, the compressor defining a suction cavity and a compression chamber, a power source, a tank having oil therein, the tank defining a tank pressure, a first oil line, and a second oil line, the second oil line and the first oil line each providing fluid communication from the tank to the compressor, the second oil line separate from the first oil line, with separate apertures from the tank;

actuating the power source, the power source thereby powering the compressor;

drawing a gas into the suction cavity of the compressor and then into the compression chamber of the compressor, compressing the gas within the compression chamber of the compressor;

discharging the compressed gas from the compressor into the tank and thereby elevating the tank pressure with the discharged compressed gas;

transporting the oil through the second oil line by virtue of the elevated tank pressure;

immediately lubricating the compressor by injecting the transported oil into the suction cavity of the compressor;

prohibiting the oil from being transported through the second oil line by closing a valve disposed within the second oil line when the tank pressure is elevated to a pre-determined tank pressure; and transporting oil through the first oil line, by virtue of the elevated tank pressure, and injecting the transported oil into the compression chamber of the compressor such that the compressor continues to be lubricated.

* * * * *